United States Patent [19]
Jasinski

[11] Patent Number: 5,555,446
[45] Date of Patent: Sep. 10, 1996

[54] SELECTIVE CALL RECEIVER CAPABLE OF REQUESTING INFORMATION FROM A COMMUNICATION SYSTEM AND METHOD THEREFOR

[75] Inventor: Leon Jasinski, Ft. Lauderdale, Fla.

[73] Assignee: Motorola, Inc., Schaumburg, Ill.

[21] Appl. No.: 391,301

[22] Filed: Feb. 21, 1995

Related U.S. Application Data

[63] Continuation of Ser. No. 955,385, Oct. 1, 1992, abandoned.

[51] Int. Cl.$^6$ ..................................................... H04B 7/00
[52] U.S. Cl. .................... 455/54.2; 455/88; 455/186.1; 340/825.44; 340/905
[58] Field of Search .................................. 455/38.1, 38.4, 455/53.1, 54.2, 56.1, 88, 89, 90, 185.1, 186.1, 186.2, 345, 346, 4.1, 4.2, 5.1, 6.3, 6.1, 6.2; 348/13, 7, 10, 12; 379/57, 58, 59, 61, 89, 63, 95–98; 340/825.44, 311.1, 905, 825.02, 825.56, 825.27; 395/600

[56] References Cited

U.S. PATENT DOCUMENTS

| | | | |
|---|---|---|---|
| 4,477,807 | 10/1984 | Nakajima et al. | 455/38.4 |
| 4,581,484 | 4/1986 | Bendig | 379/96 |
| 4,783,654 | 11/1988 | Ichikawa . | |
| 4,812,843 | 3/1989 | Champion, III et al. | 379/57 |
| 4,845,491 | 7/1989 | Fascenda et al. . | |
| 4,875,038 | 10/1989 | Siwiak et al. . | |
| 4,876,538 | 10/1989 | Andros et al. | 340/825.44 |
| 4,951,044 | 8/1990 | Nelson et al. . | |
| 5,058,201 | 10/1991 | Ishii et al. | 455/56.1 |
| 5,086,510 | 2/1992 | Guenther et al. | 455/345 |
| 5,131,020 | 7/1992 | Liebesny et al. | 379/59 |
| 5,241,305 | 8/1993 | Fascenda et al. | 455/31.1 |
| 5,426,422 | 6/1995 | Vanden Heuvel et al. | 340/825.44 |

FOREIGN PATENT DOCUMENTS 2216319 10/1989 United Kingdom ..................... 379/61

OTHER PUBLICATIONS

C+P Telephone Yellow Pages, Jan. 1992.

Primary Examiner—Reinhard J. Eisenzopf
Assistant Examiner—Nguyen Vo
Attorney, Agent, or Firm—Keith A. Chanroo

[57] ABSTRACT

A communication system has a base station having memory for storing information within a plurality of information files relating to a plurality of information services. A receiver receives an information service request for requesting information within at least one of the plurality of information files from a selective call receiver. A transmitter transmits the information requested from within the at least one information service file to the selective call receiver. The selective call receiver includes a generator for generating the information service request and a transmitter transmitting the information service request. The selective call receiver receives the information transmitted from the base station in response to the information service request and a display displays the received information.

15 Claims, 6 Drawing Sheets

5,555,446

SELECTIVE CALL RECEIVER CAPABLE OF REQUESTING INFORMATION FROM A COMMUNICATION SYSTEM AND METHOD THEREFOR

This is a continuation of application Ser. No. 07/955,385 filed on Oct. 1, 1992. Now abandoned.

FIELD OF THE INVENTION

This invention relates in general to communication systems and more specifically to a selective call receiver within a communication system capable of requesting information.

BACKGROUND OF THE INVENTION

Generally, selective call receivers sub:scribing to a paging system are capable of receiving messages broadcast from the paging system addressed to one or a group of selective call receivers. The selective call receivers, by monitoring an assigned frequency, receive the messages from a central transmitter. Each message intended for a particular selective call receiver is encoded with the address of that selective call receiver which notifies the selective call receiver that a message is being sent from the central transmitter.

Some selective call receivers have acknowledge-back capability, that is, the selective call receivers are capable of responding to the transmission of an address from the central paging station by transmitting a short message to the central paging system to confirm receipt of its address or to redirect the message to an alternative selective call receiver. Similarly, an acknowledge-back paging system include:s a central station which broadcast messages to one or a group of selective call receivers having acknowledge-back capabilities, the group of selective call receivers, upon receipt of the message, transmit an acknowledge-back response to the central station, preferably on a different frequency sub-band being allocated to the selective call receivers in the group.

Additionally, some selective call receivers are capable of receiving multi-recipient messages or information from various types of information services, for example, stock markets, sports, weather and new reports, etc. The multi-recipient messages, when transmitted, are capable of being received by only those pagers who are authorized to access the multi-recipient messages. Therefore, once a selective call receiver is authorized to access multi-recipient messages, the selective call receiver receives that type of message when it is being transmitted unless the pager is turned-off. Accordingly, the selective call receivers receive message only when the paging central station is transmitting and may devote enormous amounts of time receiving a very long message which shortens battery life because battery saving features are disabled when the selective call receiver is receiving the multi-recipient messages from an information services.

Thus, what is needed is a convenient and simple method for subscribing to a plurality of information services.

SUMMARY OF THE INVENTION

A communication system comprises a base station having memory for storing information within a plurality of information files relating to a plurality of information services. A receiver receives an information service request for requesting information within at least one of the plurality of information files from a selective call receiver. A transmitter transmits the information requested from within the at least one information service file to the selective call receiver. The selective call receiver includes a generator for generating the information service request and a transmitter for transmitting the information service request. The selective call receiver receives the information transmitted from the base station in response to the information service request and a display displays the received information.

In a communication system, a method for requesting information comprises the steps of (a) storing information in a base station within a plurality of information files relating to a plurality of information services;

(b) receiving a request from a selective call receiver for information within one of the plurality of information files;

(c) transmitting the information requested within the at least one information service file to the selective call receiver requesting same;

(d) generating, in the selective call receiver, the information service request;

(e) transmitting the information service request to the base station;

(f) receiving the information transmitted from the base station in response to the information service requested by the selective call receiver; and (g) displaying the received information.

DESCRIPTION OF A PREFERRED EMBODIMENT

Figure 1:
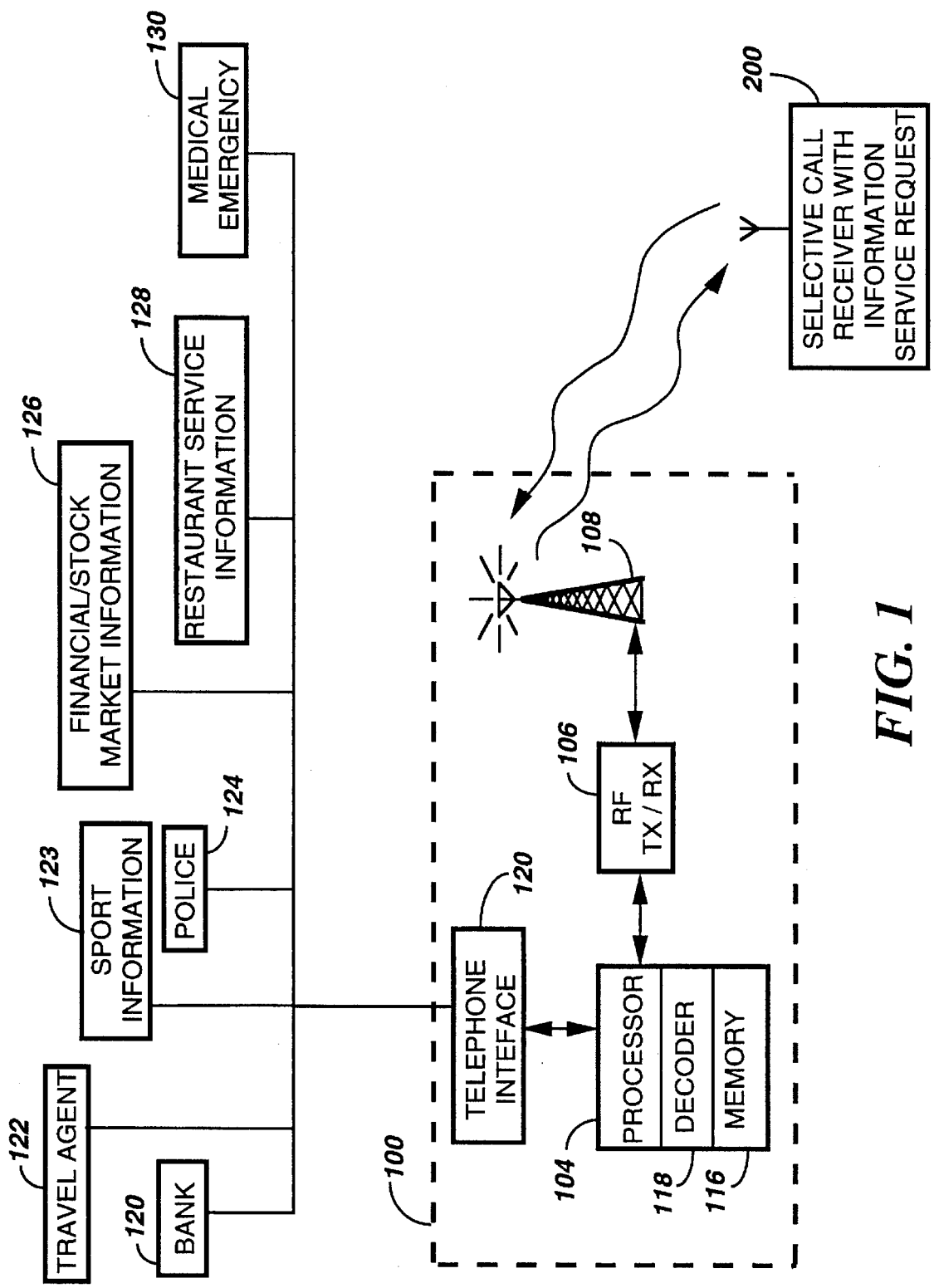
FIG. 1 is a block diagram of a communication system in accordance with a preferred embodiment of the present invention.

Referring to FIG. 1, a block diagram of a communication system is shown in accordance with the preferred embodiment of the present invention. A base station 100 includes a Radio Frequency (RF) transmitter/receiver 106 capable of transmitting and receiving information well known to those skilled in the art. The transmitter/receiver 106 is coupled to a processor 104, the processor 104 having a decoder 118 for decoding information service requests and other information received by the transmitter/receiver 106. A memory 116 stores information relating to a plurality of information service providers (or information services or information service files) 60, 122–124, 126,128, and 130.

Figure 2:
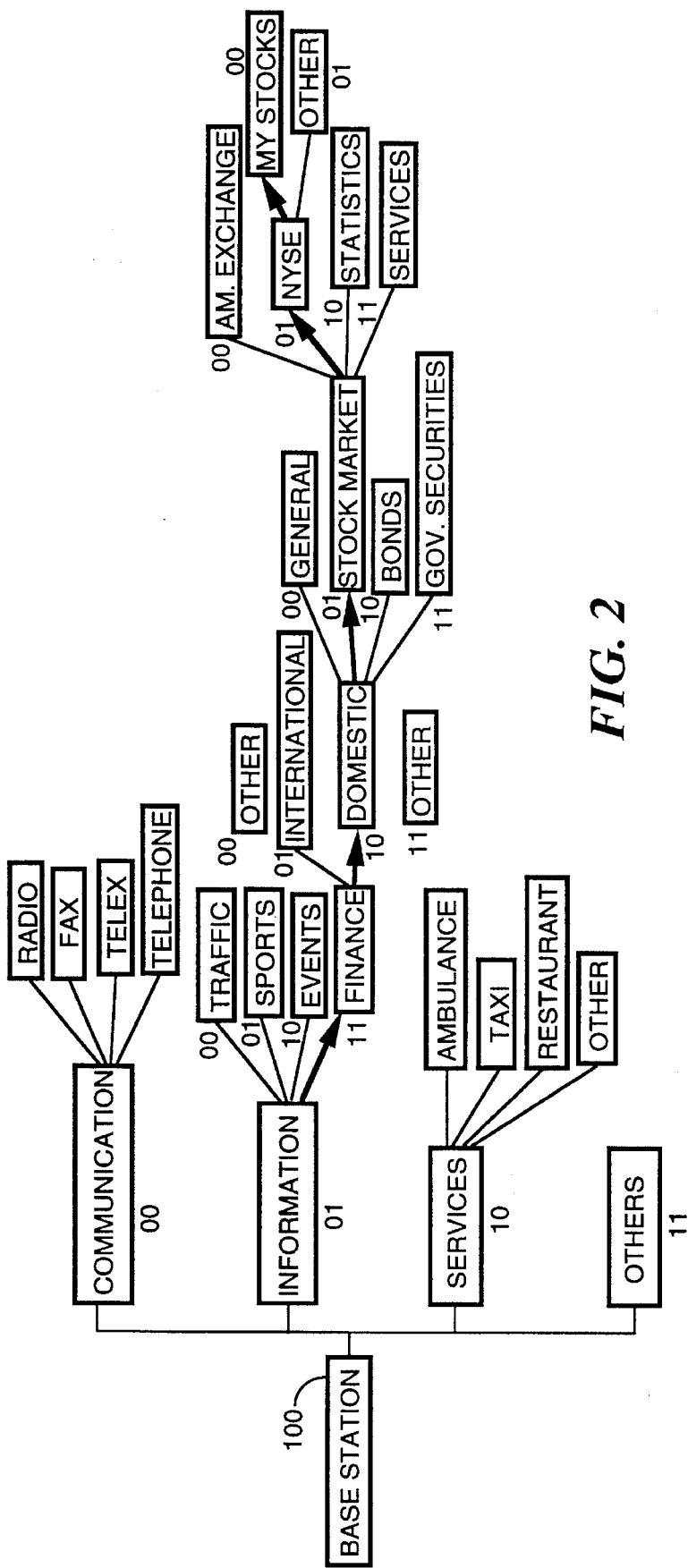
FIG. 2 is a block diagram of a hierarchy-tree-structure arrangement of a plurality of information service in accordance with the preferred embodiment of the present invention.
Figure 3:
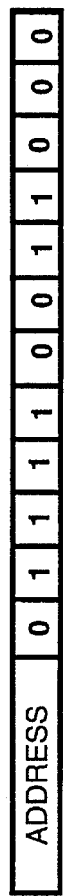
FIG. 3 is an information service request indicating an encoded codeword designating an information service from which information is requested in accordance with the preferred embodiment of the invention.

The plurality of information service providers 120,122–124,126,128, and 130 are preferably coupled to a telephone interface 120 which is coupled to the processor 104. When the processor 104 receives information from the plurality of information services 120,122–124,126,128 and 130, the information is stored in memory. Access to the information files is provided by a hierarchy-tree-structure unique to the information services being subscribed to by each selective call receiver which is further described below. The plurality of information services 120,122–124,126,128 and 130, as shown, is coupled to the processor 104 via the telephone interface 120 for periodically receiving information to update the memory 116. A selective call receiver 200, as shown, is capable of requesting information from a selected information service being subscribed to by that selective call receiver 200 by transmitting the information service request to the base station 100 to be described in detail below. The base station 100, upon receipt of the information service request, accesses the information from the selected information service file of the plurality of information service files or directly from the service providers 120,122–124,126,128 and 130. FIG. 2 is an illustration of a hierarchy-tree-structure arrangement of the plurality of information service providers in accordance with the preferred embodiment of the present invention. Accordingly, the base station 100 is shown coupled to at least a subset of the plurality of information service providers. Some of the information service providers have corresponding information service files for storing information in memory 116 that is periodically received from respective information service providers. Those of ordinary skill in the art will appreciate that the plurality of information service providers can be alternatively coupled to transmitters and receivers (not shown) for providing communication between the base station 100 and the plurality of information service providers. This information service files store the most recent information as received from the respective information service providers. This information is then readily accessible to the selective call receivers 200 subscribing to that information service. Access to the information service is shown categorized in blocks of four according to the preferred embodiment o:f the present invention, but any other number of categorizations will be equally suitable. By using a four-level categorization, each of the four information services can be accessed by encoding two bits in the information service request, for example, communication by "00", information by "01", services by "10", and others by "11". Further reference to FIG. 3 shows an encoded information service request 300 according to the preferred embodiment of the present invention.

For illustration, if a user of a selective call receiver 200 is requesting information from "MY STOCKS" where FIG. 2 illustrates the subscription list for the requesting selective call receiver 200, the user, by selecting an appropriate switch, selects"INFORMATION" (FIG. 2) which encodes "01" in the information service request position 1. A further selection of "FINANCE" encodes "11" in the information request position 2. Subsequent selections of "DOMESTIC", "STOCK MARKET", "NYSE", and finally, "MY STOCKS" as shown by the bold directional arrow in FIG. 2 results in the information service request being encoded with the series of bits "011110010100", positions 1–6. The information service request 300 is then encoded with the address of the selective call receiver 200 from which the base station 100 determines whether the selective call receiver 200 has access to the selected information service, and if so, the base station 100 retrieves the requested information. A similar hierarchy-tree-structure access information is stored in memory of the base station for each selective call receiver identifying the information services and access to the information that are accessible by each selective call receiver. Those skilled in the art will appreciate that each selective call receiver 200 can have different information services in its hierarchy-tree-structure because each selective call receiver can subscribe to different information services. Accordingly, the subscription list of the selective call receiver 200 is stored in the memory 116 of the base station which uses the address of the information service request 300 to provide information back to the requesting selective call receiver 200. In this way, each selective call receiver subscribes only to the information services from which information is needed, the base station stores the list of information services available to each selective call receiver which is determined by an address assigned to each selective call receiver. Additionally, by arranging the each subset of information service being subscribed o by each selective call receiver in the hierarchy-tree-structure, the information service request is encoded with 2×N bits which provides access information to $2^N$ number of information service providers.

Figure 4:
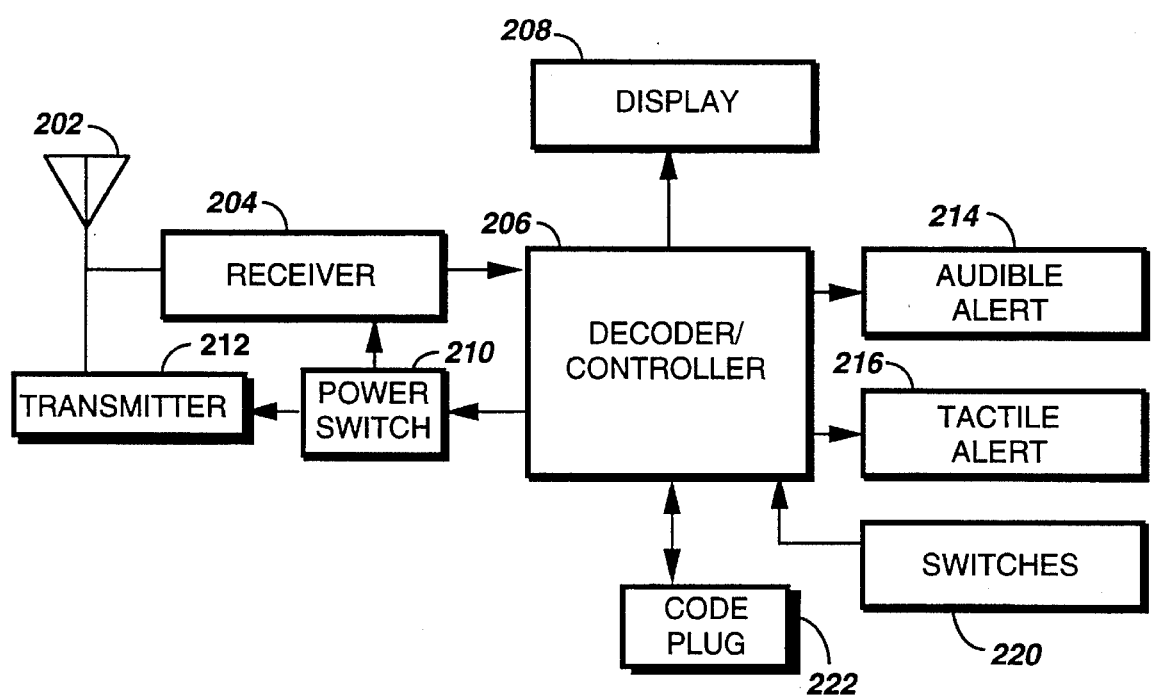
FIG. 4 is an electrical block diagram of a selective call receiver capable of requesting information in accordance with the preferred embodiment of the present invention.

FIG. 4 is an electrical block diagram of a selective call receiver in accordance with the preferred embodiment of the present invention. The selective call receiver 200 comprises an antenna 202 for intercepting transmitted radio frequency (RF) signals which are coupled to the input of a receiver 204. The RF signals are preferably selective call (paging) message signals which provide a receiver address and an associated message, such as numeric or alphanumeric message. However, it will be appreciated that other well known paging signaling formats, such as tone only signaling or tone and voice signaling, would be suitable for use as well. The receiver 204 processes the RF signal and produces at the output a data stream representative of a demodulated address and message information. The demodulated address and message information are coupled into the input of a decoder/controller 206 which processes the information in a manner well known in the art. A power switch 210, coupled to the decoder/controller 206, is used to control the supply of power to the receiver 204, thereby providing a battery saving function as is well known in the art for use with selective call receivers. The power switch 210 also provides power to a transmitter 212 which transmits the information service request 300 (FIG. 3) to the base station 100.

For purposes of this illustration, it will be assumed that the POCSAG signaling format is utilized which is well known in the art, although other signaling formats could be utilized as well. When the address is received by the decoder/controller 206, the received address is compared with one or more addresses stored in a code plug (or code memory) 222, and when a match is detected, an alert signal is generated to alert a user that a selective call message, or page, has been received. The alert signal is directed to an audible alerting device 214 for generating an audible alert or to a tactile alerting device 216 for generating a silent vibrating alert. Switches 220 allow the user of the selective call receiver to select between the audible alert 214 and the tactile alert 216 in a manner well known in the art.

The message information which is subsequently received is stored in memory (not shown) and can be accessed by the user for display using one or more of the switches 220 which provide such additional functions as reset, read, and delete, etc. Specifically, by the use of appropriate functions provided by the switches 220, the stored message is recovered from memory and processed by the decoder/controller 206 for displaying by a display 208 which enables the user to view the message. Specifically, the switches 220 include switches for selection of the information service providers included in the subscription list and for encoding the information service request 300 as discussed above. The switches 220 also include a transmit switch (not shown) in accordance with the preferred embodiment for transmitting the information service request 00 to the base station 100. In this fashion, the user, by selecting the appropriate switches of switches 220, encodes the information service request 300 which is transmitted by pressing the transmit switch on switches 220 (not shown).

Figure 5:
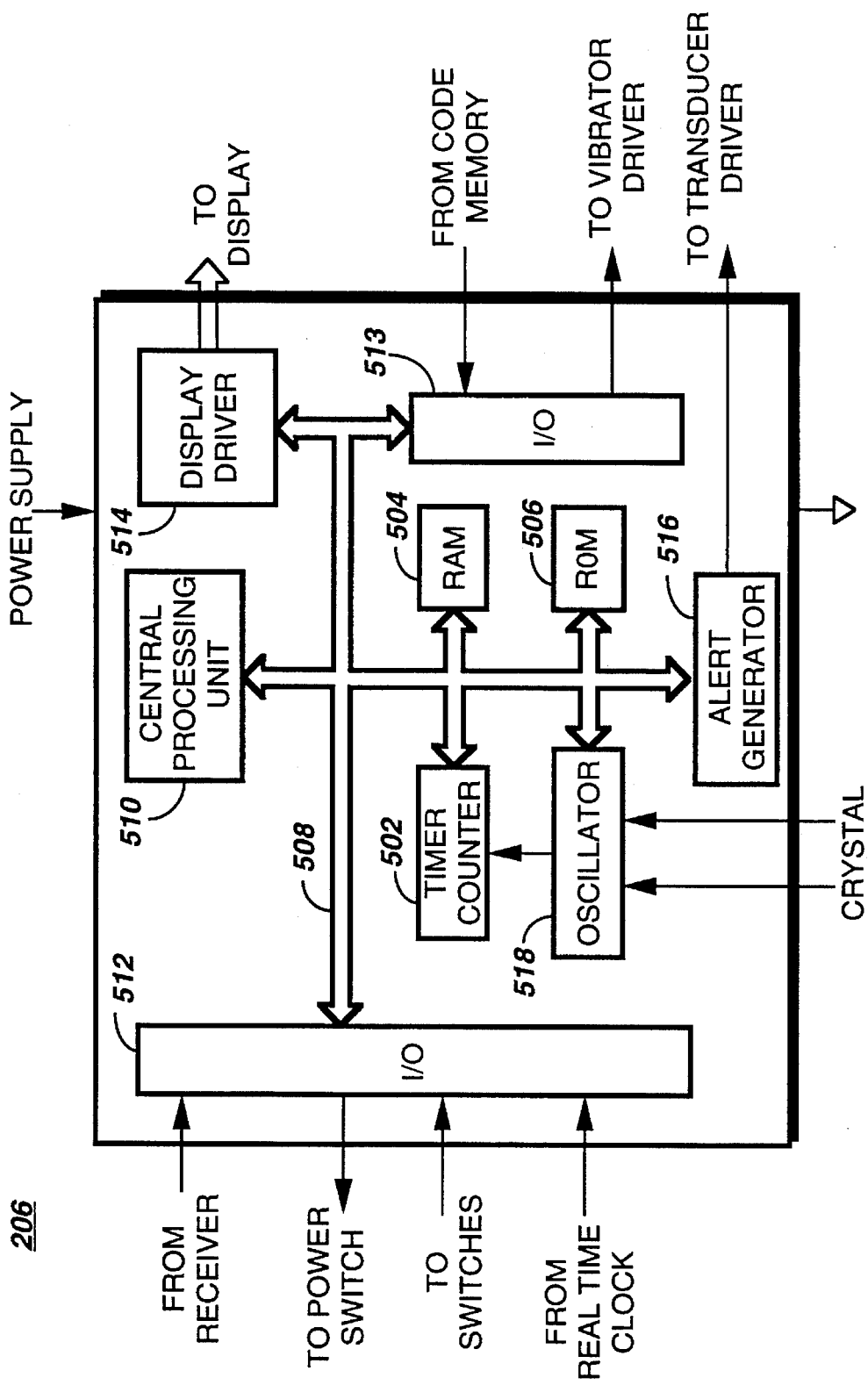
FIG. 5 is an electrical block diagram of the microcomputer used in the base station of FIG. 1 and the selective call receiver of FIG. 4.

The controller/decoder 206 of FIG. 4 can be constructed utilizing a microcomputer as shown in FIG. 5. FIG;. 5 is an electrical block diagram of a microcomputer based decoder/controller suitable for use in the selective call receiver of FIG. 4 or the processor of FIG. 1. As shown, the microcomputer 206 is preferably an MC68HC05 microcomputer such as manufactured by Motorola, Inc., which includes an on-board display driver 514. The microcomputer 206 includes an oscillator 518 which generates the timing signals utilized in the operation of the microcomputer 206. A crystal, or crystal oscillator (not shown) is coupled to the inputs of the oscillator 518 to provide a reference signal for establishing the microcomputer timing. A timer/counter 502 couples to the oscillator 518 and provides programmable timing functions which are utilized in controlling the operation of the receiver or the processor. A RAM (random access memory) 504 i:s utilized to store variables derived during processing, as well as to provide storage of message information which are received during operation as a selective call receiver. A ROM (read only memory) 506 stores the subroutines which control the operation of the receiver or the processor, as is well known to those skilled in the art. It will be appreciated that in many microcomputer implementations, the programmable-ROM (PROM) memory area can be provided by an EEPROM (electrically erasable programmable read only memory). The oscillator 518, timer/counter 502, RAM 504, and ROM 506 is coupled through an address/data/control bus 508 to a central processing unit (CPU) 510 which performs the instructions and controls the operations of the microcomputer 206.

The demodulated data generated by the receiver is coupled into the microcomputer 206 through an input/output (I/O) port 512. The demodulated data is processed by the CPU 510, and when the received address is the same as the code-plug memory which couples into the microcomputer through an I/O port 513, the message, if any, is received and stored in RAM 504. Recovery of the stored message, and selection of the predetermined destination address, is provided by the switches which are coupled to the I/O port 512. The microcomputer then recovers the stored message and directs the information over the data bus 508 to the display driver 514 which processes the information and formats the information for presentation by a display such as an LCD (liquid crystal display). At the time a selective call receiver address is received, the alert signal is generated which can be routed through the data bus 508 to an alert generator 516 that generates the alert signal which is coupled to the audible alert device that was described above. Alternatively, when the vibrator alert is selected as described above, the microcomputer generates an alert enable signal which is coupled through data bus 508 to the I/O port 513 to enable generation of a vibratory, or silent alert.

The battery saver operation is controlled by the CPU 510 with battery saving signals which are directed over the data bus 508 to the I/O port 512 which couples to the power switch. Power is periodically supplied to the receiver to enable decoding of the received selective call receiver address signals and any message information which is directed to the receiver or to the transmitter.

Figure 6:
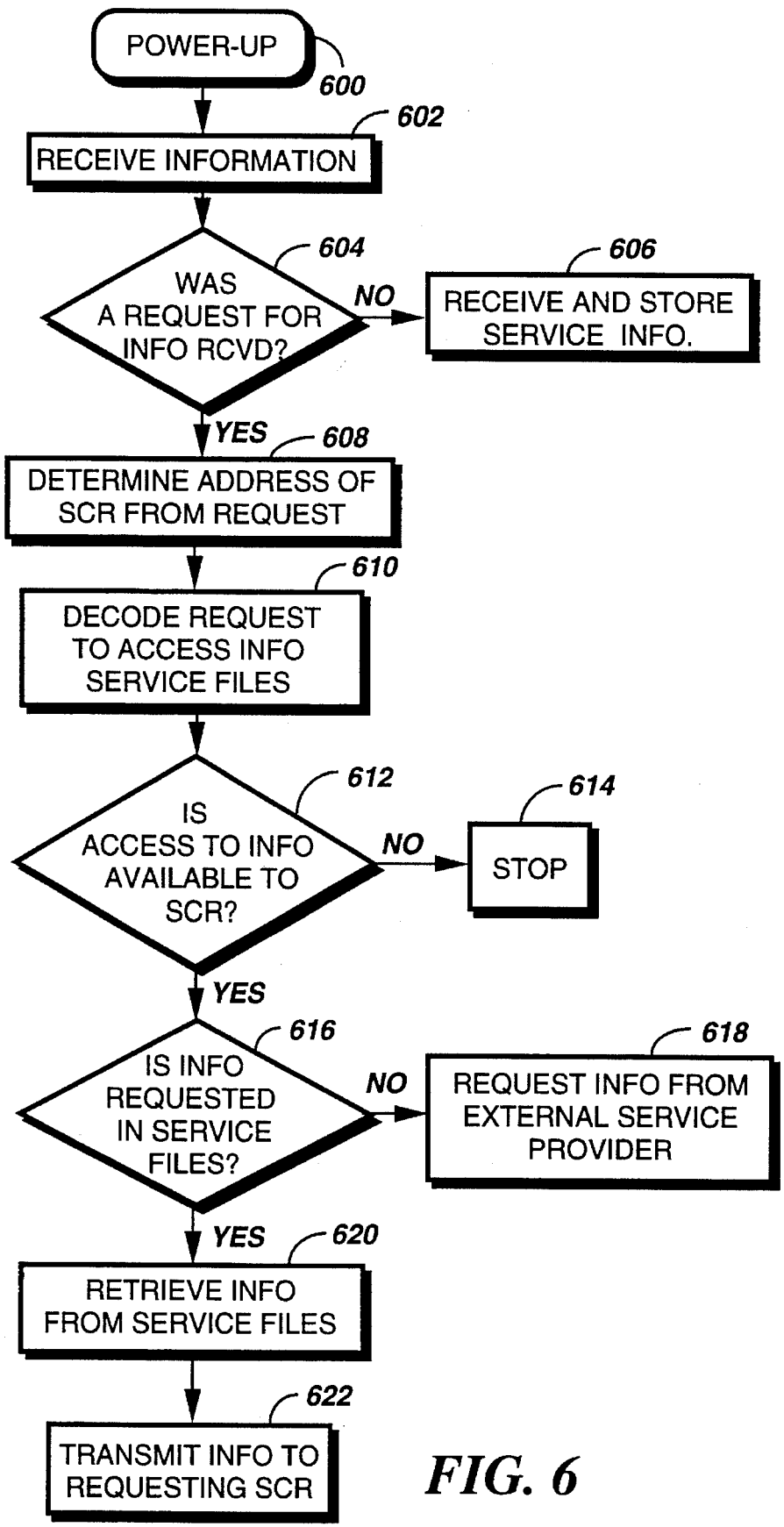
FIG. 6 is a flow diagram illustrating the operation of the communication system of FIG. 1.

FIG. 6 is a flow diagram illustrating the operation of the communication system in FIG. 1. Operationally, the base station 100, after power-up (step 600), waits to receive information, step 602. According to the preferred embodiment of the present invention, the information received comprises either a request for information service from the selective call receiver 200 or information from any of the plurality of information service providers or information services coupled to the base station. Step 604 determines if the received information is an information service request. If it is determined otherwise, the received information is stored in the information service file being allocated for that type of service information, step 606. However, when the received information is the information service request, the processor of the base station decodes the address of the selective call receiver requesting information, step 608, and decodes the information service request to determine the information file in which the information being requested according to the hierarchy-tree-structure of the preferred embodiment, step 610. In step 612, the processor determines if that selective call receiver has access to the information service being requested. If the selective call receiver has no access to the information being requested, the base station terminates further processing, step 614. When access is available, that is, when the selective call receiver has requested information from a information service being subscribed to by the selective call receiver, the base station determines whether the information requested is stored in memory in one of the plurality of information service files, step 616. If no, the base station sends out a request via a modem or other suitable transmitting means well known in the art, step 618. Such a request may include a request for help, for example, medical or police services, etc. In step 616, when the requested information is stored in one of the plurality of information files, the request information is retrieved, step 620, and encoded by well known techniques for subsequent transmission. The information is then transmitted at the first data rate over a communication channel to the selective call receiver, step 622. As is well known, the information being transmitted to the selective call receiver is preferably transmitted at a high data rate in a wide band channel, for example, 32 kbps, 64 kbps, etc. because of a high power transmitter which is available at the base station.

Figure 7:
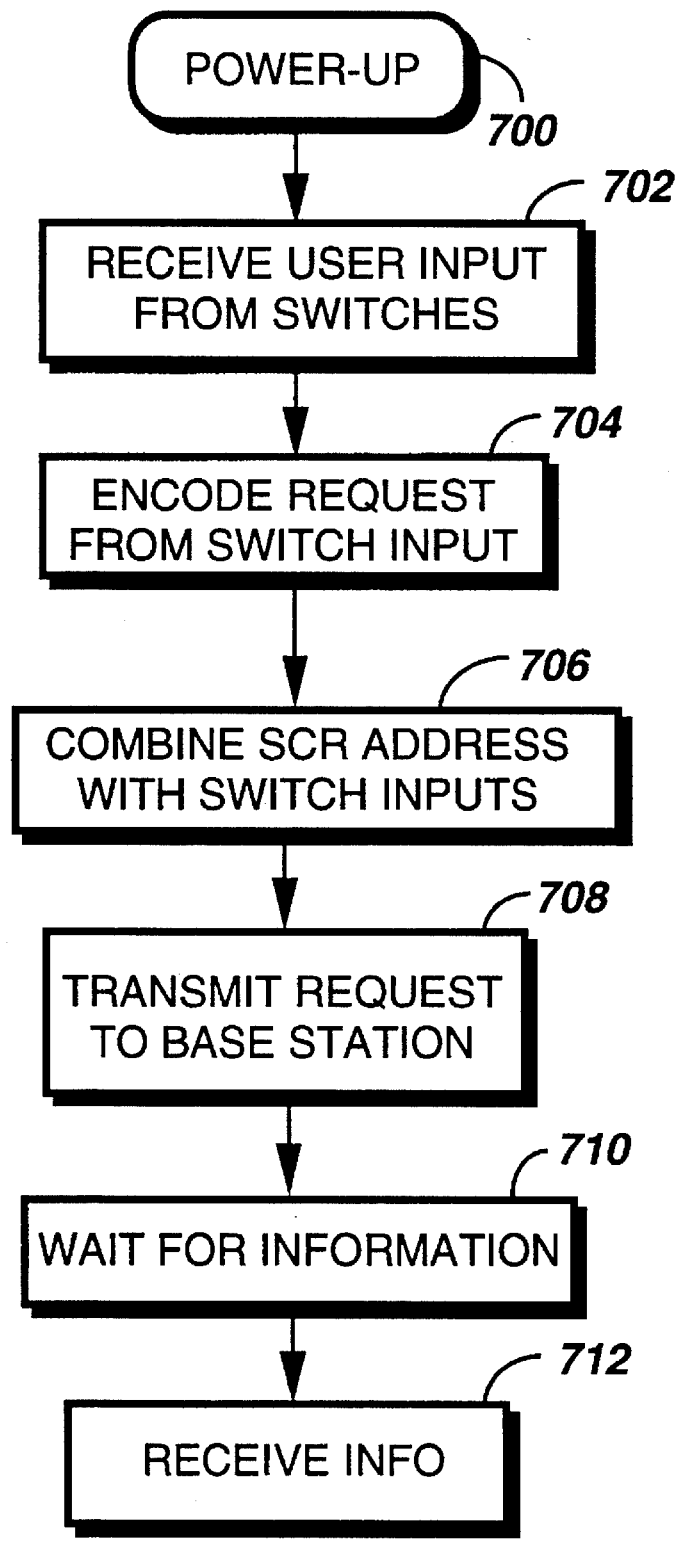
FIG. 7 is a flow diagram illustrating t:he operation of the selective call receiver of FIG. 4.

Further in FIG. 7, a flow diagram of the operation of the selective call receiver of FIG. 4 is shown. Operationally, when the user of the selective call receiver desires information relating to any of the subset of the plurality of information services that are subscribed to, the user, subsequent to power-up (step 700), presses the switches as discussed in FIG. 4 to encode the information service request for requesting information from the desired information service, step 702. The information service request is encoded according to the hierarchy-tree-structure for designating the selected information service, step 704. The encoded information service request is then combined with the address of the selective call receiver, step 706, and then transmitted to the base station, step 708.

In this way, the information being encoded in the hierarchy-tree-structure for designating the information service allows the selective call receiver to access the plurality of information service or information service providers with the fewest number of bits in the information service request. Also, because the selective call receiver is a low power device, using the fewest number of bits is attractive because lower power will be expended to transmit the information service request when the transmission is constrained in a narrow band channel having a low data rate, for example, 50 bps or 100 bps.

Continuing, after the information service request has been sent, the selective call receiver waits for the requested information, step 710. When the selective call receiver detects its address, it receives the information being requested for the information service provider via the base station, step 712. Therefore, the selective call receiver being able to subscribe to a plurality of information service providers having access being determined with the fewest number of bits in the hierarchy-tree-structure thereby allowing the user of the selective call receiver to easily encode the information service request for requesting information from any of the information service providers that the selective receiver has a subscription. Furthermore, because the selective call receiver only receives information when requested, the selective call receiver may have access to many different information services for which the designated access codes are minimized by encoding via the hierarchy-tree-structure. In this way, the selective call receiver is not bombarded with information as it becomes available regardless of whether the information is requested by the user of the selective call receiver. Therefore, the selective call receiver can maintain its battery saving features thereby maintaining or improving its required battery life.

In summary, the preferred embodiment of the present invention includes a communication system comprising a base station and a plurality of selective call receivers. The base station has a plurality of information files coupled to a plurality of information service providers. A microcomputer for processing information and information service requests decodes the information service requests from selective call receivers. Memory, preferably included in the microcomputer, stores access information relating to a subscription to at least a subset of the plurality of information service providers by each of the plurality of the selective call receivers. The base station has a receiver for receiving information service requests from the plurality of selective call receivers and for receiving information from the plurality of information service providers. The information from the information service providers are stored in respective information service files being designated to store information from that information service provider within the base station. A transmitter coupled to the microcomputer transmits the information to the selective call receiver requesting same. Each selective call receiver subscribing to at least a subset of the plurality of information service providers is capable of requesting data from one of the subset of information service providers. The selective call receiver includes a transmitter transmitting the information service request to the base station at a low data rate over the radio communication channel encoded to indicate the information service provider from which the information is being requested. A microcomputer coupled to the transmitter processes the information service request and encodes the information service request in a codeword for identifying the information service provider from the subset of information service providers from which data information is being requested. The codeword comprises a plurality of bits organized in a frame for identifying the information service provider wherein access to the subset of information service providers being subscribed to by the selective call receiver is organized in an hierarchy-tree-structure within the base station. The codeword is preferably encoded with 2×N of which N bits representing N number of levels in the hierarchy-tree-structure wherein $2^{2N}$ represents the number of information service providers capable of being accessed by said selective call receiver having the codeword encoded with 2×N bits. Similarly, represents the number of a plurality of information files capable of being accessed. The base station, upon receipt of the codeword, identifies the information service provider by decoding the plurality of bits indicating the hierarchy-tree-structure for determining the information service provider from which information is being requested by the selective call receiver. A receiver coupled to the microcomputer receives information from the information service provider via the base station at a high data rate substantially higher that the data rate used for transmitting the information service request.

I claim:

1. A communication system, comprising:

a base station including:
means for storing information within a plurality of information files relating to a plurality of information services, said means for storing stores access information relating to the plurality of information services wherein said access information being arranged in a hierarchy-tree-structure for providing access to the information being stored;
means for receiving an information service request for requesting the information within at least one of the plurality of information files from a selective call receiver; and
means for transmitting the information requested from within the at least one of the plurality of information files to the selective call receiver; and the selective call receiver including:
means for generating the information service request, said means for generating generates the information service request in a code word having a series of bits for identifying the at least one of the plurality of information files, wherein the plurality of information files are, organized in a hierarchy-tree-structure and the codeword having 2×N series of bits capable of providing access to N levels of the plurality of information files of the hierarchy-tree structure wherein every 2 bits of the 2×N series of bits provides access to a different level of the hierarchy-tree-structure;
means for transmitting the information service request;
means for receiving the information transmitted from the base station in response to the information service request;
means for storing the information being received; and
means for displaying the information.

2. The communication system according to claim 1 wherein the base station is coupled to a plurality of information service providers capable of providing the information to the plurality of information files, said plurality of information service providers periodically update the information stored in the plurality of information files.

3. The communication system according to claim 1 wherein the base station further including a means for processing the information service request.

4. The communication system according to claim 3 wherein the processing means further including a means for decoding the information service request.

5. The communication system according to claim 1 wherein the codeword is encoded with 2×N number of bits corresponding to N number of levels of the hierarchy-tree-structure wherein $2^{2N}$ represents a number of the plurality of information files capable of being accessed by said selective call receiver transmitting the information service request having a 2×N bit codeword.

6. The communication system according to claim 1 wherein the transmitting means of the base station further including means for communicating with information service providers external to the base station in response to the information service request.

7. The communication system according to claim 1 wherein the selective call receiver further including an inputting means for enabling a user to request information.

8. A selective call receiver capable of generating an information service request, comprising:

means for generating the information service request, said means for generating generates the information service request in a codeword having a 2×N series of bits capable of providing access to N levels of a plurality of information files wherein every 2 bits of the 2×N series of bits provides access to a different level of information in the plurality of information files organized in a hierarchy-tree-structure;

means for transmitting the information service request on a first frequency requesting information to a base station coupled to a plurality of information services;

means for receiving the information transmitted from the base station on a second frequency in response to the information service request;

means for storing the information being received; and means for displaying the received information.

9. The selective call receiver according to claim 8 wherein the codeword is encoded with 2×N number of bits corresponding to N number of levels of the hierarchy-tree-structure and wherein $2^{2N}$ represents a number of the plurality of information files capable of being accessed by said selective call receiver transmitting the information service request in a 2×N bit codeword.

10. The selective call receiver according to claim 8 further comprising an inputting means for inputting the information for selecting the plurality of information services.

11. In a communication system, a method for requesting information comprising the steps of:

(a) storing the information, in a base station, within a plurality of information files relating to a plurality of information services, said step of storing stores access information relating to the plurality of information files wherein said access information being arranged in a hierarchy-tree-structure for providing access to the information stored in the base station;

(b) receiving a request from a selective call receiver for the information within at least one of the plurality of information files;

(c) transmitting the information requested within the at least one of the plurality of information files to the selective call receiver requesting the information;

(d) generating, in the selective call receiver, a information service request, said step of generating generates the information service request in a codeword having a 2×N series of bits capable of providing access to N levels of the plurality of information files wherein every 2 bits of the 2×N series of bits provides access to a different level of information in the plurality of information files organized in the hierarchy-tree-structure;

(e) transmitting the information service request to the base station;

(f) receiving the information transmitted from the base station in response to the information service request by the selective call receiver;

(g) storing the information being received in the selective call receiver, and (h) displaying the received information.

12. The method according to claim 11 further comprising the step of processing the information service request by the base station to determine the information file from which the information is being requested.

13. A communication system, comprising:

a base station; and a plurality of selective call receivers;

said base station having a plurality of information files coupled to a plurality of information service providers, said base station comprising:

processing means for processing information and information service requests, said processing means further including a decoding means for decoding the information service requests;

memory means coupled to the processing means for storing access information relating to a subscription to at least a subset of the plurality of information service providers by each of the plurality of selective call receivers;

base station receiving means for receiving the information service requests from the plurality of selective call receivers and for receiving the information from the plurality of information service providers;

base station transmitting means coupled to the processing means for transmitting the information to the selective call receiver requesting same; and each selective call receiver subscribing to at least a subset of the plurality of information service providers wherein each selective call receiver capable of requesting the information from one of the subset of the information service providers, each selective call receiver comprising:

portable transmitting means for transmitting the information service request to the base station at a first information rate over a radio communication channel indicating the information service provider from which the information is being requested;

portable processing means coupled to the portable transmitting means for processing the information service request, said processing means further including an encoding means for encoding the information service request in a codeword for identifying the information service provider from the subset of the information service providers from which information is being requested, said codeword comprises a plurality of bits organized in a frame for identifying the information service provider wherein access to the subset of the information service providers being subscribed to by the selective call receiver is organized in a hierarchy-tree-structure wherein the codeword has 2×N series of bits capable of providing access to N levels of the plurality of information files of the hierarchy-tree structure wherein every 2 bits of the 2×N series of bits provides access to a different level of the hierarchy-tree structure within the base station, and upon receipt of the codeword by the base station, the base station identifies the information service provider by decoding the plurality of bits indicating the hierarchy-tree-structure for determining the information service provider from which the information is being requested by the selective call receiver; and portable receiving means coupled to the processing means for receiving the information from the information service provider via the base station at a second information rate substantially higher than the first information rate.

14. The communication system according to claim 13 wherein the codeword comprising N bits representing N number of levels in the hierarchy-tree-structure wherein $2^{2N}$ represents the number of the information service providers capable of being accessed by said selective call receiver having the codeword encoded with 2×N bits.

15. A selective call receiver subscribing to at least a subset of a plurality of information service providers coupled to an external base station, comprising:

transmitting means for transmitting an information service request to said external base station indicating an information service provider from which information is being requested, said information service request being transmitted at a first information rate over a radio communication channel;

processing means coupled to the transmitting means for processing the information service request, said processing means further including an encoding means for encoding the information service request into a codeword identifying the information service provider from the subset of the plurality of information service providers from which the information is being requested, said codeword comprises an 2×N series of bits organized in a frame for identifying N levels of information service providers wherein every 2 bits of the 2×N series of bits is capable of providing access to a different level of the N levels of information service providers being organized in a hierarchy-tree-structure; and receiving means coupled to the processing means for receiving the information from the information service provider via the external base station at a second information rate substantially higher than the first information rate.

* * * * *